United States Patent
Yamashita

(10) Patent No.: US 7,719,779 B2
(45) Date of Patent: May 18, 2010

(54) LENS DRIVING DEVICE

(75) Inventor: Hiroshi Yamashita, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/209,781

(22) Filed: Sep. 12, 2008

(65) Prior Publication Data
US 2009/0073585 A1    Mar. 19, 2009

(30) Foreign Application Priority Data
Sep. 14, 2007    (JP)    ............... 2007-239418

(51) Int. Cl.
*G02B 7/02*    (2006.01)
(52) U.S. Cl. ................................... 359/824
(58) Field of Classification Search ......... 359/811–826, 359/694–698, 699–703; 369/44.16, 44.21
See application file for complete search history.

(56) References Cited

U.S. PATENT DOCUMENTS 5,471,100 A * 11/1995 Sakamoto et al. ........ 310/12.04
6,839,899 B2 * 1/2005 Takeshita et al. ............ 720/681
7,298,562 B2 * 11/2007 Sue et al. .................... 359/819
7,505,219 B2 * 3/2009 Ho et al. ...................... 359/824

FOREIGN PATENT DOCUMENTS

JP    2004-280031 A    10/2004

* cited by examiner

*Primary Examiner*—Ricky L Mack
*Assistant Examiner*—Vipin M Patel
(74) *Attorney, Agent, or Firm*—Ditthavong, Mori & Steiner, P.C.

(57) ABSTRACT

A lens driving device is provided with a holder that holds a lens, a supporting portion that supports the holder displaceably along an optical axis of the lens, and at least one magnet that is arranged symmetrically with respect to the optical axis on side surfaces of the holder. The supporting portion is provided with a coil so as to face toward the magnet. The supporting portion is also provided with a magnetic member so as to face toward the magnet.

4 Claims, 8 Drawing Sheets

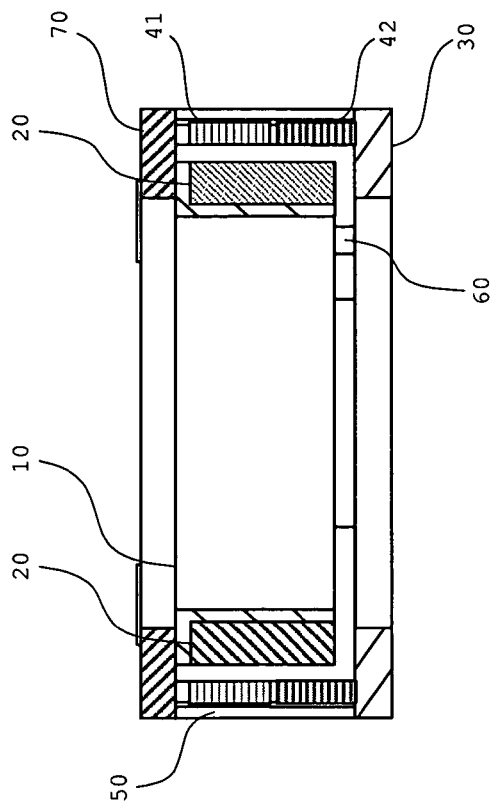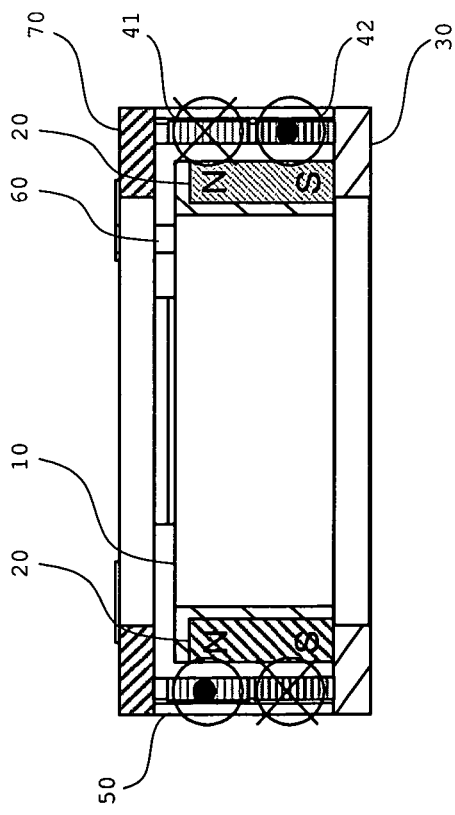

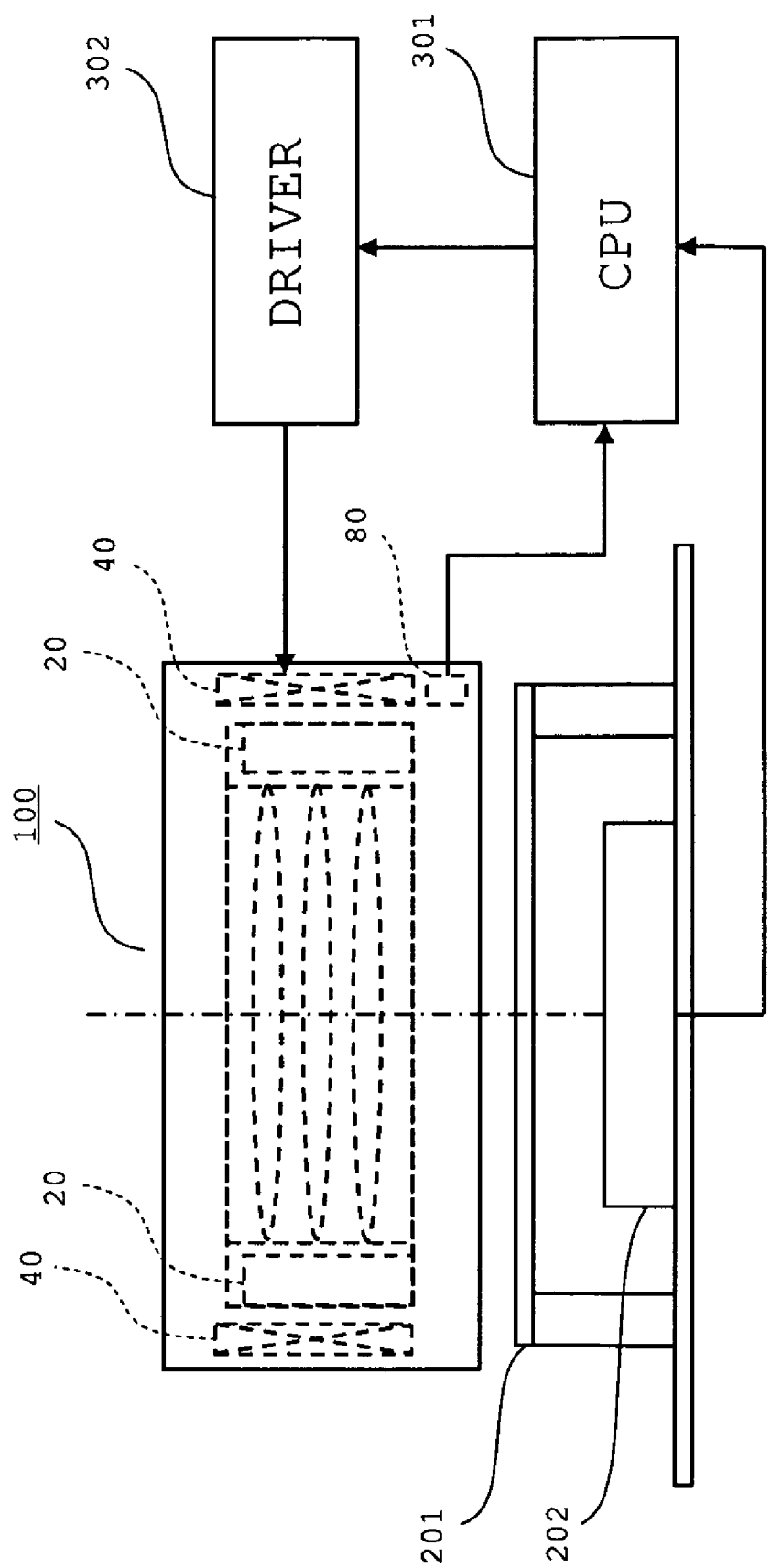

LENS DRIVING DEVICE

This application claims priority under 35 U.S.C. Section 119 of Japanese Patent Application No. 2007-239418 filed on Sep. 14, 2007, entitled "LENS DRIVING DEVICE."

BACKGROUND OF THE INVENTION

1. Field of the Invention

The present invention relates to lens driving devices, and in particular to a lens driving device that is suitably mounted on a small camera or the like to provide auto-focus functionality.

2. Description of the Related Art

Conventionally, various lens driving devices are mounted on optical devices. As known examples of such lens driving devices, there are motor driven actuators utilizing a stepping motor, piezoelectric actuators utilizing piezoelectric distortion when an electric field is applied to a crystalline body, and electromagnetic actuators utilizing a voice coil that are adopted for loudspeakers or the like.

For example, a voice coil lens driving device is mounted on a camera in order to realize auto-focus functionality. With the voice coil lens driving device, a coil is attached to a holder that holds a lens, and a magnet is attached to a base. Application of current to the coil produces electromagnetic driving force. The electromagnetic driving force drives the holder along a direction of an optical axis of the lens.

With the voice coil lens driving device, a spring member that supports the holder may also be used for supplying power to the coil. With this configuration, a wire for power supply to the coil does not have to be drawn from the holder. As a result, undesirable vibration or tensile force may not be applied to the wiring when driving the lens. Therefore, it is possible to suppress a problem that such vibration or tensile force may damage the wiring may be suppressed. On the other hand, however, this configuration has a problem that yield ratio at production of actuators is easily reduced because the configuration of the spring is complicated.

The above problem may be eliminated by attaching the magnet to the holder and the coil to the base. With this configuration, the wiring to the holder is not necessary in the first place, and the damage to the wiring and the like when driving the lens fails to occur. Further, it is possible to simplify the configuration.

However, because a magnet is generally heavier than a coil, attaching a magnet to the holder makes the movement of the holder and the lens difficult. In particular, when the holder is driven in a vertical direction, a difference between downward movement and upward movement is easily generated due to an influence of gravitational force. For example, there may be differences in speeds when starting to move and drive responses between downward movement and upward movement (hereinafter, such a difference in the movement is referred to as a "drive difference"). Therefore, with this configuration, a smooth lens driving may not be realized when moving the holder in a vertical direction.

SUMMARY OF THE INVENTION

An object of the present invention is to provide smooth driving of a lens even when a holder is moved in a vertical direction.

A lens driving device according to the present invention includes: a holder that holds a lens; a supporting portion that supports the holder displaceably along an optical axis of the lens; at least one magnet that is arranged symmetrically with respect to the optical axis on a side surface of the holder; at least one coil that is arranged on the supporting portion so as to face toward the magnet; and at least one magnetic member that is arranged on the supporting portion so as to face toward the magnet.

According to the lens driving device of the present invention, the holder is attracted outwardly by magnetic force acting between the magnet and the magnetic member along an in-plane direction vertical to the optical axis of the lens. The holder is in a suspended state by this attracting force, and becomes less susceptible to an influence of gravitational force. Accordingly, a drive difference between movements of the holder when the holder is driven upward and downward is reduced, and as a result, the lens may be smoothly driven.

Further, with the lens driving device according to the present invention, the supporting portion may be provided with a guiding portion that guides the holder displaceably along the optical axis by restricting movement of the holder along a direction vertical to the optical axis. In this case, when the magnetic member is arranged so that magnetic force produced in an in-plane direction vertical to the optical axis is imbalanced, force acting on the holder may be biased. Due to this bias of the force, the holder moves along the guiding portion while being pressed against the guiding portion. Thus, it is possible to realize the lens driving without shaking.

Further, with the lens driving device according to the present invention, the magnetic member may be arranged so that the magnetic force produced in the in-plane direction vertical to the optical axis is balanced. With such a configuration, because the holder is suspended stably without being biased to one direction, the movement of the holder may be more stabilized.

BRIEF DESCRIPTION OF THE DRAWINGS

These and other objects and novel features of the present invention will become more fully apparent from the following description and appended drawings, in which:

FIG. 4A is a view illustrating a driving status of the lens driving device according to the embodiment, where the holder is at a home position;

FIG. 4B is a view illustrating a driving status of the lens driving device according to the embodiment, where the holder is at a position displaced upwardly from the home position;

FIG. 5 is a view illustrating a configuration of a camera module according to the embodiment;

It should be understood that these drawings are only illustrative, and not limiting the scope of the present invention.

DESCRIPTION OF PREFERRED EMBODIMENTS

Figure 1:
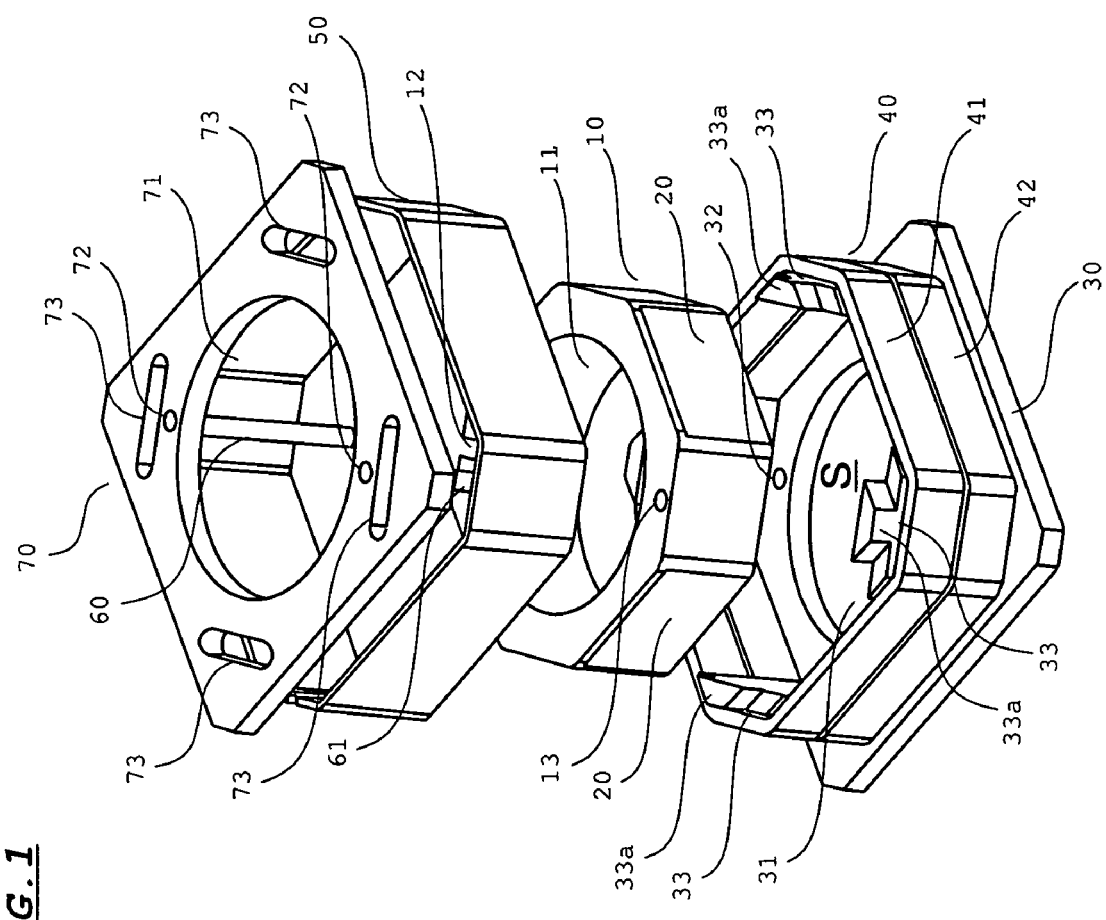
FIG. 1 is an exploded perspective view illustrating a configuration of a lens driving device according to an embodiment.
Figure 2B:
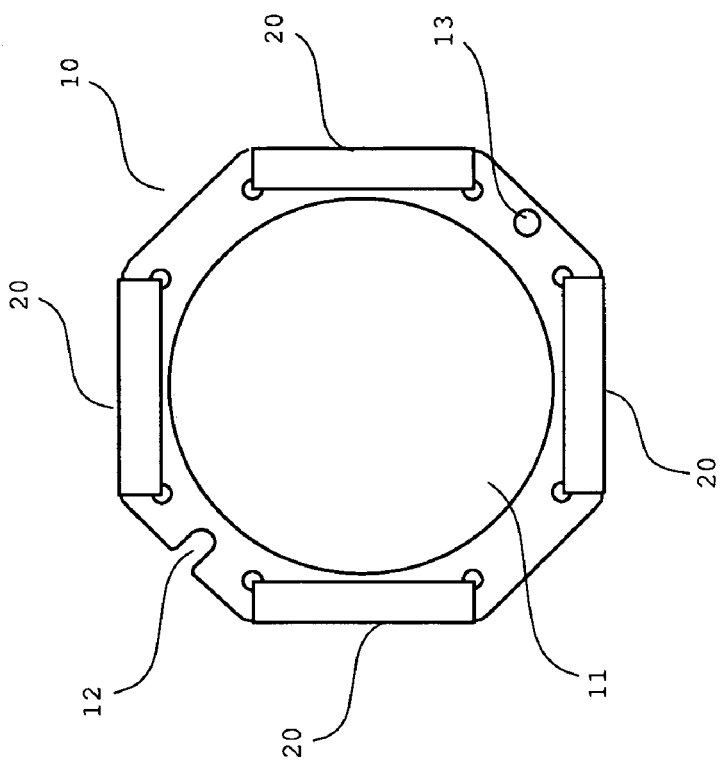
FIG. 2B is a view illustrating the configuration of the lens holder according to the embodiment (bottom view)
Figure 2A:
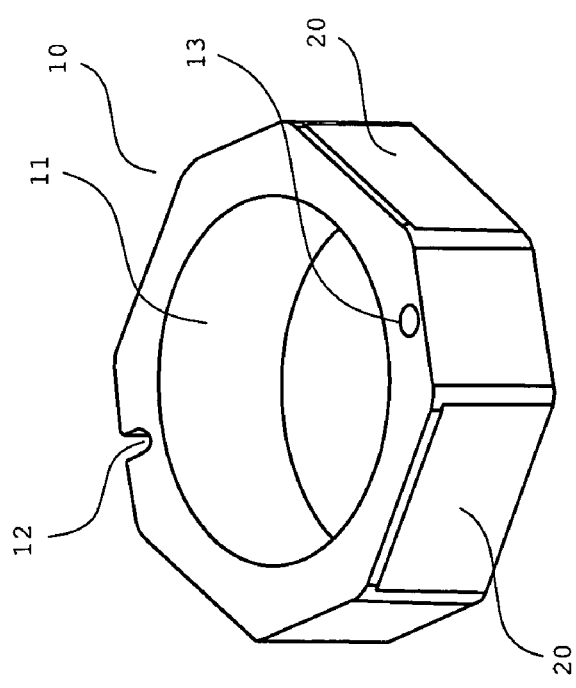
FIG. 2A is a view illustrating a configuration of a lens holder according to the embodiment (perspective view)

FIG. 1 is an exploded perspective view illustrating a lens driving device according to an embodiment. FIGS. 2A and 2B are views illustrating a configuration of a lens holder, and FIG. 2A is a perspective view and FIG. 2B is a bottom view.

A numeral number 10 indicates a lens holder. The lens holder 10 is in an octagonal shape as viewed in a plane. The lens holder 10 is provided with a circular opening 11 for containing a lens at a central position thereof. Eight side surfaces of the lens holder 10 are arranged symmetrically with respect to an optical axis of the lens attached to the opening 11. Further, the lens holder 10 is provided with a groove 12 and a hole 13 that engage with shafts 60 and 61. Further, a magnet 20 is attached on each of two of the eight side surfaces of the lens holder 10 that face each other and the other two of the side surfaces that are respectively perpendicular to the two side surfaces. The magnets 20 have a dipolar arrangement in which north and south poles are magnetized on one side. Further, sizes and magnetic intensities of the magnets 20 are substantially equal to each other.

A numeral number 30 indicates a base (corresponds to a supporting portion of the present invention). The base 30 is formed substantially in a rectangular plate. The base 30 is provided with an opening 31 through which light that has transmitted through the lens is directed to an image sensor, as well as two holes 32 through which the shafts 60 and 61 are inserted. Further, the base 30 is provided with four guiding bodies 33 about the opening 31. A projection 33a is formed at each of tip ends of these guiding bodies 33. A space defined by the four guiding bodies 33 corresponds to a containing space S in which the lens holder 10 is contained.

A coil 40 is wound around an outer circumference of the four guiding bodies 33. The coil 40 includes a first coil 41 and a second coil 42. The first coil 41 and the second coil 42 are connected in series and wound in opposite directions to each other. As a result, directions of current that flows through the first coil 41 and the second coil 42 are opposite.

A numeral number 50 indicates a frame member (corresponds to a magnetic member of the present invention). The frame member 50 is such that a plate member made of magnetic material is formed into a substantially annular shape. The frame member 50 is attached to the base 30, and surrounds substantially an entire outer circumference of the coil 40 (an outer circumference of the lens holder 10). It should be noted that width and thickness of the frame member 50 are substantially equal over its entirety.

The numeral numbers 60 and 61 indicate the shafts (correspond to a guiding portion of the present invention). The shafts 60 and 61 have a circular cross-section, and respectively configured to have a diameter greater than inner diameters of a hole 12 and a groove 13 on the lens holder 10. It should be noted that the shafts 60 and 61 may be formed by either magnetic material or non-magnetic material.

A numeral number 70 indicates a cover. The cover 70 is, similarly to the base 30, formed substantially in a rectangular plate. The cover 70 is provided with an opening 71 through which light is introduced. Further, the cover 70 is provided with two holes 72 through which the shafts 60 and 61 are inserted, as well as four elongated holes 73 through which the projection 33a of the guiding bodies 33 is inserted.

When assembling, the lens holder 10 is contained into the containing space S of the base from above, so that the groove 12 and the hole 13 of the lens holder 10 align with the holes 32 of the base 30. In this state, the four magnets 20 face toward the coil 40 with a predetermined clearance therebetween. Further, four side surfaces of the lens holder 10 that do not have the magnet 20 are arranged adjacent to sides of the guiding bodies 33. It should be noted that, although not shown in the drawing, the lens is previously attached to the opening 11 of the lens holder 10.

Next, the shaft 60 is inserted into the groove 12 and then into the holes 32 from up above the base 30, and its lower end is fixed to a bottom surface of the base 30. Similarly, the shaft 61 is inserted into the hole 13 and then into the holes from up above the base 30, and its lower end is fixed to a bottom surface of the base 30. Further, the frame member 50 is attached to the base 30 from above.

Finally, the cover 70 is attached to the base 30 from above. At this time, the two holes 72 are over top ends of the shafts and 61, and the four elongated holes 73 are over the projections 33a. With this, the lens holder 10 is attached to the base 30 and the cover 70 displaceably along the two shafts and 61.

Figure 3B:
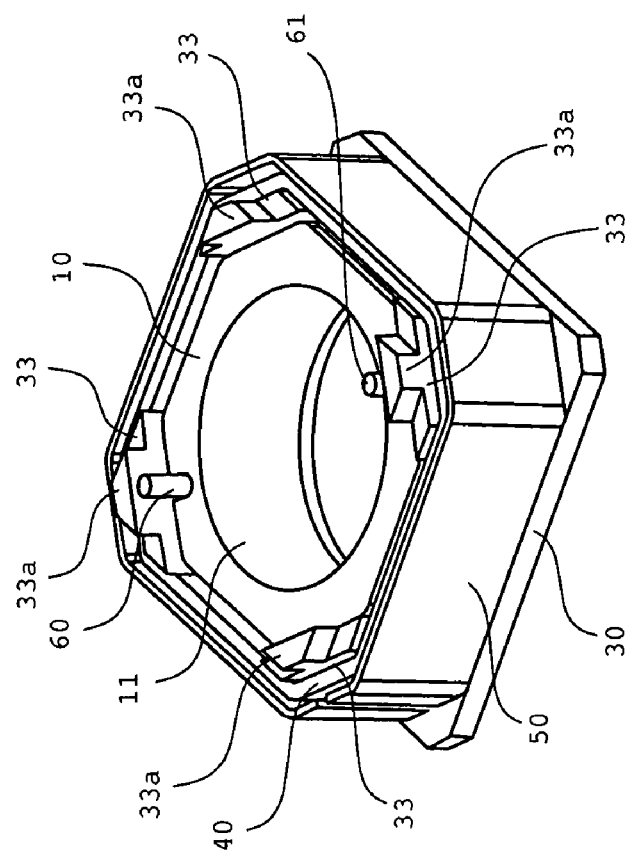
FIG. 3B is a view of the lens driving device with a cover removed so as to illustrate an interior of the lens driving device after assembled according to the embodiment.
Figure 3A:
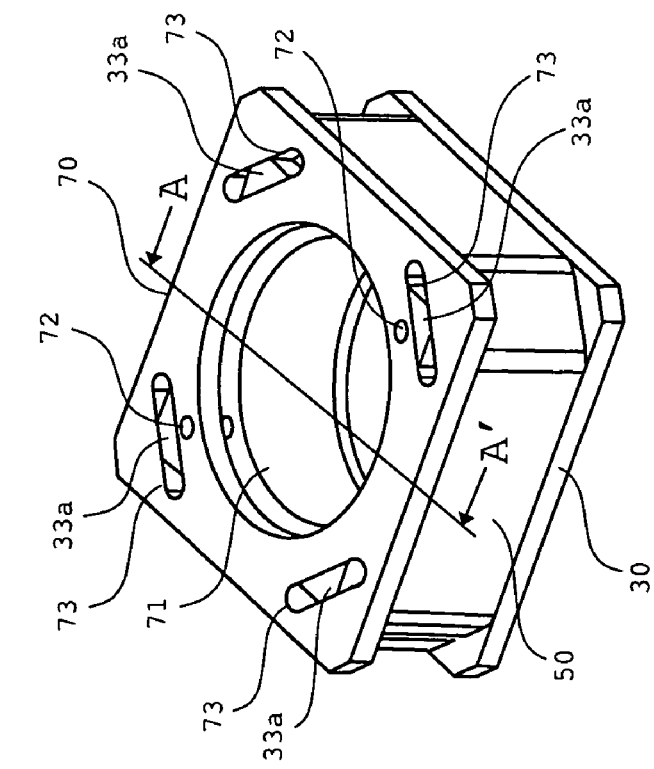
FIG. 3A is a view illustrating a configuration of the lens driving device after assembled according to the embodiment.

FIG. 3A is a view illustrating a configuration of the lens driving device after assembled. FIG. 3B is a view of the lens driving device with the cover 70 removed so as to illustrate an interior of the lens driving device shown in FIG. 3A.

In an assembled state, the north pole of the magnet 20 faces toward the first coil 41 that is positioned above, and the south pole of the magnet 20 faces toward the second coil 42 that is positioned below. Accordingly, when drive current is applied to the first coil 41 and the second coil 42, electromagnetic driving force acts upon the magnet 20, and the lens holder 10 slides along the shafts 60 and 61.

FIG. 4 illustrates a driving operation of the lens driving device. FIG. 4 shows cross-sectional views taken along line A-A' in FIG. 3A.

FIG. 4A is a view illustrating a state when the lens holder 10 is at a home position. When the lens holder 10 is at the home position, a lower end of the lens holder 10 is in contact with the base 30. As described above, north and south magnetized areas of the magnet 20 are respectively face toward the first coil 41 and the second coil 42. Further, the directions of the current that flows through the first coil 41 and the second coil 42 are opposite.

When the current of the direction shown in FIG. 4A flows through the first coil 41 and the second coil 42 when the lens holder 10 is at the home position, upward driving force acts upon the magnet 20, and the lens holder 10 is displaced along the shafts 60 and 61 upwardly from the home position, as shown in FIG. 4B. Further, when the current of the direction opposite from the direction shown in FIG. 4A flows through the first coil 41 and the second coil 42 at the state shown in FIG. 4B, downward driving force acts upon the magnet 20, and the lens holder 10 is displaced along the shafts 60 and 61 downwardly. In FIG. 4A, a circle with a dark dot indicates the direction approaching toward a viewing side, and a circle with a cross indicates the direction moving away from the viewing side.

As described above, in the lens driving device of this embodiment, the lens is positioned at an on-focus position by displacing the lens holder 10 upwardly and downwardly. At this time, due to magnetic force produced between the four magnets 20 and the frame member 50, the lens holder 10 is attracted from two opposite directions and the other two opposite directions that are respectively perpendicular to the two opposite directions, and the lens holder 10 is in a state in which the holder is suspended toward the outer circumference with substantially equal intervals by the attractive forces from four directions. As a result, when the lens holder 10 is driven in the vertical direction, the lens holder 10 is less susceptible to the influence of gravitational force, and a less drive difference is produced between the movements of the lens holder 10 when driven downward and upward. Further, if power supply to the coil 40 is blocked after the lens is positioned at the on-focus position, the lens holder 10 is held at this on-focus position by this attractive force.

As described above, in this embodiment, the drive difference between the movements in the upward driving and downward driving becomes small even when the lens holder is driven in the vertical direction, and therefore, the lens holder 10 may be smoothly driven even when the lens driving device is used so that the lens holder is driven in the vertical direction.

Further, in this embodiment, because the magnets 20 and the coils 40 are provided on the both side surfaces of the lens holder 10, unlike the configuration in which a magnet and a coil are arranged only on one side surface of the lens holder, a moment may not act upon the lens holder 10 when driving the lens holder 10. Accordingly, the lens holder 10 may be smoothly driven, and driving torque may be reduced.

It should be noted that in this embodiment, as described above, the size and the magnetic intensity of the four magnets 20 are substantially equal to each other. In this case, by making distances between outer surfaces of these four magnets 20 and an inner surface of the frame member 50 equal, the magnetic force produced between each magnet 20 and the frame member 50 also becomes equal, and these four magnetic forces are balanced in-plane direction that is perpendicular to the optical axis of the lens. Thus, because balancing these four magnetic forces brings the lens holder 10 into a stably suspended state without biased, the operation of the lens holder 10 may be more stabilized.

FIG. 5 is a view illustrating a schematic configuration of a camera module when a lens driving device 100 according to this embodiment is mounted on a camera.

On a side of the base 30, a filter 201 and an image sensor 202 are provided. The base 30 is provided with a hall element 80 as a position sensor, and a position of the lens holder 10 is detected based on a signal from the hall element 80.

When focusing, a CPU (Central Processing Unit) 301 controls a driver 302 so that the lens holder 10 is displaced toward the optical axis of the lens to a predetermined position from the home position shown in FIG. 4A. At this time, a position detection signal from the hall element 80 is inputted to the CPU 301. At the same time, the CPU 301 processes a signal inputted from the image sensor 202 to obtain a contrast value of an image that has been picked up. Then, a position of the lens holder 10 at which the contrast value becomes most preferable is obtained as the on-focus position.

Then, the CPU 301 drives the lens holder 10 toward the on-focus position. At this time, the CPU 301 monitors the signal from the hall element 80, and continues to drive the lens holder 10 until the signal from the hall element 80 comes to a state that corresponds to the on-focus position. Thus, the lens holder 10 is positioned at the on-focus position.

Although the embodiment according to the present invention has been described above, the present invention is not limited to such an embodiment, and various modifications may be made to the embodiment according to the present invention other than what has been described above.

Figure 6A:
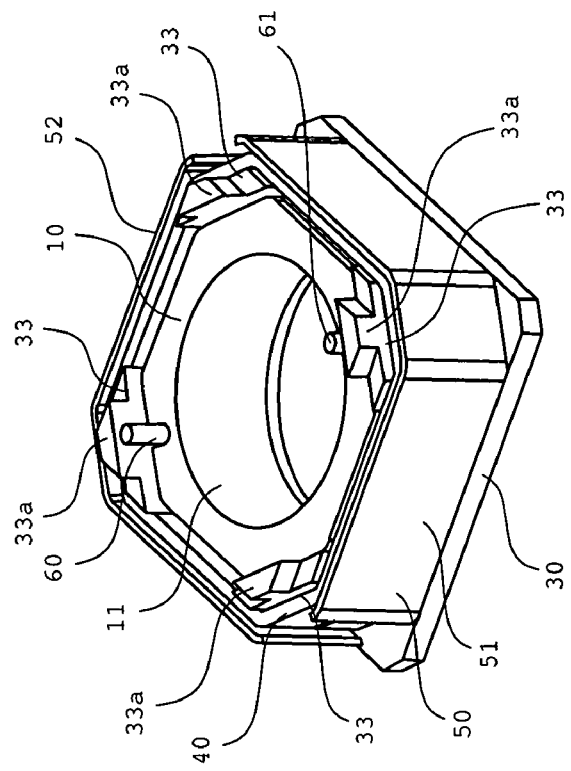
FIG. 6A is a view illustrating a first modified example of a frame member according to the embodiment.
Figure 6B:
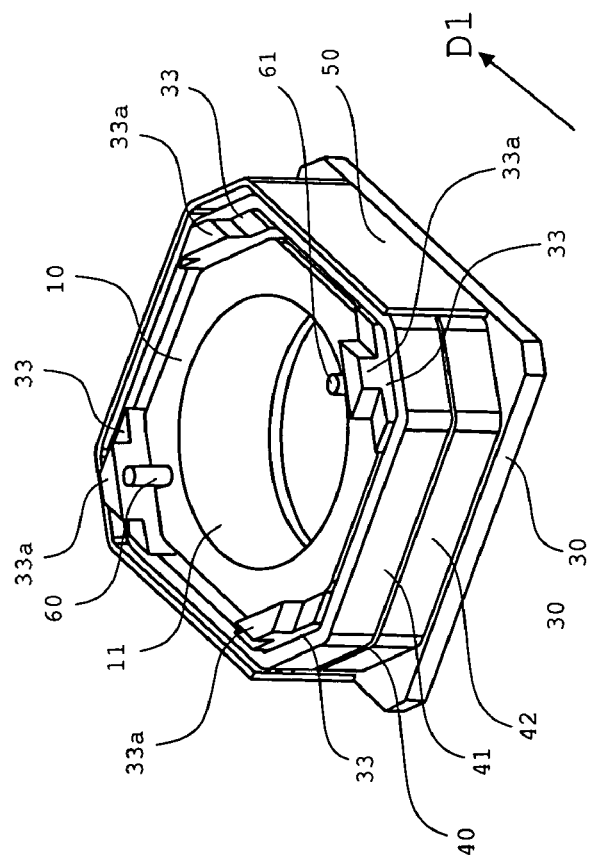
FIG. 6B is a view illustrating a second modified example of the frame member according to the embodiment.
Figure 7:
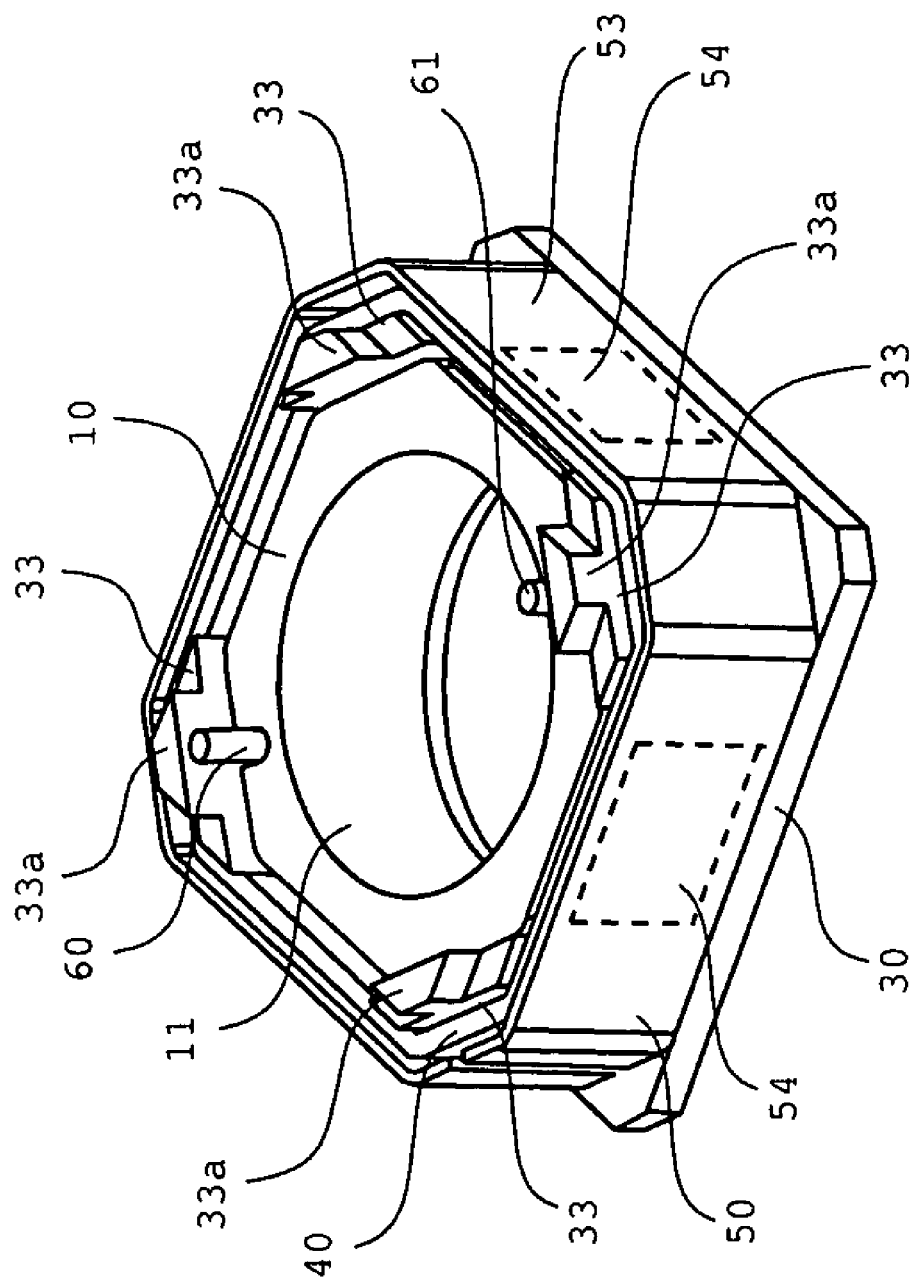
FIG. 7 is a view illustrating a third modified example of the frame member according to the embodiment.

For example, various modifications may be made to an arrangement of the magnetic member, as shown in FIG. 6 and FIG. 7.

In a modified example shown in FIG. 6A, the frame member 50 is formed substantially in a C shape when viewed in plane such that frame member 50 surrounds three of the magnets and does not cover the remaining one of the magnets. When taking such a configuration, the magnetic force produced between the magnet 20 and the frame member 50 becomes imbalanced in a direction along which only one of the magnets is covered by the frame member 50, and thus the lens holder 10 is attracted toward a direction indicated by an arrow D1. Accordingly, the shafts 60 and 61 are pressed against inner surfaces of the groove 12 and the hole 13 on a side of the frame member 50, and, when driving the lens holder 10, the lens holder 10 moves along the shaft 60 while the groove 12 and the hole 13 are respectively pressed against the shafts 60 and 61. Accordingly, it is possible to effectively suppress shaking of the lens holder 10 when driving the lens holder 10, thereby realizing a smooth driving operation.

It should be noted that, in this modified example, in comparison with the above embodiment, because the force for suspending the lens holder 10 is slightly reduced, the effect of reducing the drive difference between the movements when driving upward and downward is also slightly reduced. However, the effect of reducing the drive difference is obtained even in this case, the modified example shown in FIG. 6A is effective when it is desired to suppress shaking of the lens holder 10 when driving the lens holder 10 and to reduce the drive difference at the same time.

Further, the magnetic force is made imbalanced by removing a part of the frame member 50 in this embodiment, a configuration in which distances between the magnets 20 and the frame member 50 are different to each other may be used as the configuration in which the magnetic force acting upon the lens holder 10 is imbalanced, or a configuration in which sizes (width or thickness) of portions of the frame member 50 that face toward the magnets 20 are different may be used.

In a modified example shown in FIG. 6B, the frame member 50 is divided into a first frame member 51 and a second frame member 52 so as to each surrounds two of the magnets 20. A predetermined clearance is provided between the first frame member 51 and the second frame member 52. Further, the first frame member 51 and the second frame member 52 are also used as the electrodes for supplying power to the coil 40. Specifically, one of the current input and output portions to and from the coil 40 is connected to the first frame member 51 and the other of the current input and output portions is connected to the second frame member 52. Further, one of the wiring for applying current from the driver 302 to the coil 40 is connected to the first frame member 51 and the other is connected to the second frame member 52. With this, it is possible to simplify the configuration for supplying power to the coil 40.

In a modified example shown in FIG. 7, the frame member 50 is configured from a main frame member 53 that surrounds the outer circumference of the coil 40 (outer circumference of the lens holder 10) and four magnetic bodies 54 attached to the main frame member 53. The main frame member 53 is made of non-magnetic material, and formed into substantially in an annular shape. Each of the magnetic bodies 54 is a rectangular plate member made of magnetic material, and attached to an inner surface of the main frame member 53 so as to face toward the magnet 20.

Magnetic force between the magnet 20 and the frame member 50 acts as a resistance against driving force of the lens holder 10 provided by power supply to the coil 40, and therefore when the magnetic force is too large, it is necessary to make the driving force of the lens holder 10 by the coil 40 greater. Thus, in the configuration in which the magnetic bodies 54 are attached to the main frame member 53 as described above, it is possible to easily adjust the magnetic force so as to be balanced with the driving force by adjusting the size of the magnetic bodies 54.

Further, in this modified example, it is possible to change the magnetic forces respectively produced between the magnets 20 and the magnetic bodies 54 by adjusting the material and the size of the magnetic bodies 54, thereby making the magnetic force acting on the lens holder 10 imbalanced. By making the magnetic force imbalanced in this manner, similarly to the modified example shown in FIG. 6A, the lens holder 10 may be moved while the groove 12 and the hole 13 are pressed respectively against the shafts 60 and 61 when driving the lens holder 10. Accordingly, it is possible to suppress shaking of the lens holder 10 when driving the lens holder 10, thereby realizing a smooth driving operation.

Further, the guiding portion for the movement of the lens holder 10 is configured from the shafts 60 and 61 in this embodiment, the present invention is not limited to this embodiment and other configurations may be possible.

Figure 8B:
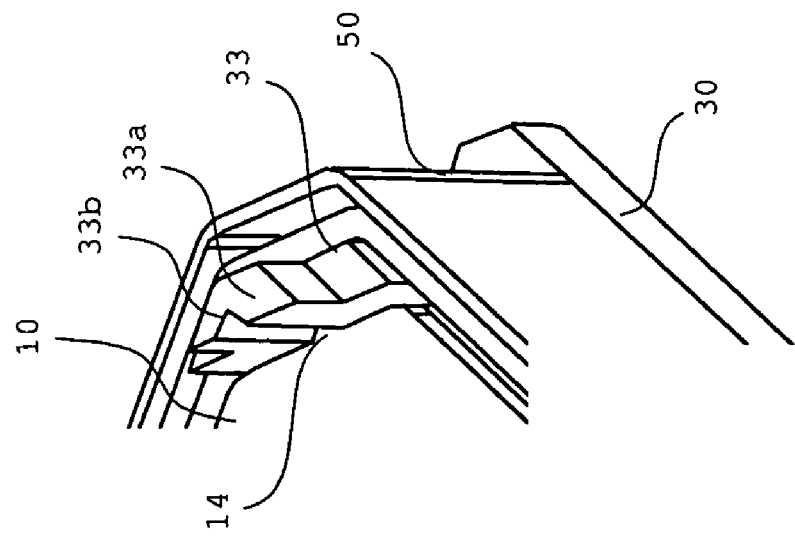
FIG. 8B is a view illustrating a different configurational example of the guiding portion according to the embodiment (assembly view).
Figure 8A:
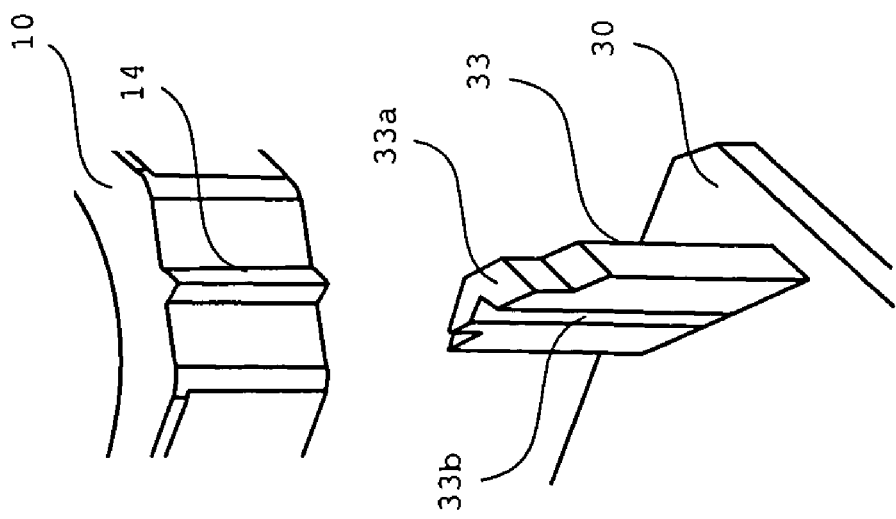
FIG. 8A is a view illustrating a different configurational example of a guiding portion according to the embodiment (exploded view)

FIG. 8 shows other configurational examples of the guiding portion. As shown in FIG. 8A, a protrusion 14 that extends vertically with a triangle cross-section is provided on each of four side surfaces of the lens holder 10 to which the magnet 20 is not attached. On the other hand, each of side surfaces of the guiding bodies 33 that face toward these four side surfaces is provided with a V-shaped groove 33b that engages with the protrusion 14.

As shown in FIG. 8B, when the lens holder 10 is attached to the base 30, the protrusion 14 fits into the groove 33b. When the lens holder 10 moves upward and downward in this state, the protrusion 14 slides within the groove 33b along the movement of the lens holder 10. With such a configuration, it is possible to easily provide a guiding structure.

Further, in this embodiment, the magnets 20 are provided on the four side surfaces of the lens holder 10. However, as long as the magnets 20 may be provided symmetrically centering the optical axis, the magnets 20 may be, for example, provided only on two of the side surfaces that face each other, or may be provided on all of the side surfaces (whole circumference) of the lens holder 10. When the magnet 20 is provided on all side surfaces of the lens holder 10, pieces of magnets may be provided annularly, or a single piece of magnet in an annular shape may be provided.

Further, in this embodiment, the magnet 20 may have a monopolar arrangement, and the coil 40 may be a single coil.

Further, various modifications may be made to the embodiment of the present invention as needed within the technical idea of the invention as shown by the scope of the invention.

What is claimed is:

1. A lens driving device comprising:
   a holder that holds a lens;
   a supporting portion that supports the holder displaceably along an optical axis of the lens;
   at least one magnet that is arranged symmetrically with respect to the optical axis on a side surface of the holder;
   at least one coil that is arranged on the supporting portion so as to face toward the magnet; and
   at least one magnetic member that is arranged on the supporting portion so as to face toward the magnet in a direction vertical to the optical axis,
   wherein
   the supporting portion is provided with a guiding portion that guides the holder displaceably along the optical axis by restricting movement of the holder along the direction vertical to the optical axis, and
   the magnetic member is arranged so that magnetic force between the magnet and the magnetic member in an in-plane direction vertical to the optical axis is imbalanced, and
   a length of the magnetic member in the optical axis direction is longer than the length of the magnet in the optical axis direction, and covers a moving range of the magnet.

2. The lens driving device according to claim 1, wherein a plurality of the magnetic members are arranged, a current input portion and a current output portion of the coil are electrically connected to two of the magnetic members, and the two magnetic members constitute electrodes for supplying current to the coil.

3. The lens driving device according to claim 1, wherein a plurality of the magnetic members are arranged on the supporting portion so as to face toward the magnet.

4. The lens driving device according to claim 1, wherein a plurality of the magnets are arranged around the optical axis.

* * * * *